(12) United States Patent
Terada et al.

(10) Patent No.: US 6,599,450 B1
(45) Date of Patent: Jul. 29, 2003

(54) METHOD OF PRODUCING RECYCLED RAW MATERIAL POWDER FOR USE IN BONDED MAGNET AND METHOD OF RECYCLING BONDED MAGNET

(75) Inventors: Takahiko Terada, Nara (JP); Hiroshi Onishi, Hirakata (JP); Yoshikazu Yamagata, Katano (JP); Fumitoshi Yamashita, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 391 days.

(21) Appl. No.: 09/696,782

(22) Filed: Oct. 26, 2000

(30) Foreign Application Priority Data

Oct. 26, 1999 (JP) ............................................. 11-303635

(51) Int. Cl.[7] .............................. B29B 9/02; B29C 70/00
(52) U.S. Cl. ....................... 264/37.1; 264/109; 264/115; 252/62.5
(58) Field of Search ............................ 264/36.1–36.22, 264/37.1–37.33, 109, 115; 252/62.5

(56) References Cited

U.S. PATENT DOCUMENTS

| | | |
|---|---|---|
| 3,714,977 A | 2/1973 | Terklesen ..................... 164/60 |
| 4,108,236 A | 8/1978 | Salkeld ..................... 164/338 R |
| 4,568,612 A | 2/1986 | Lehner et al. |
| 4,712,604 A | 12/1987 | Sawyer ........................ 164/513 |
| 4,763,716 A | 8/1988 | Graham et al. ........... 164/122.1 |
| 4,773,467 A | 9/1988 | Graham et al. ........... 164/122.1 |
| 4,774,992 A | 10/1988 | George ..................... 164/122.1 |
| 4,819,709 A | 4/1989 | Lallement ................... 164/154 |
| 5,246,503 A | 9/1993 | Minick |
| 5,275,228 A | 1/1994 | Wortmann et al. ........ 164/122.2 |
| 5,429,176 A | 7/1995 | Atkinson et al. ............ 164/412 |
| 5,607,007 A | 3/1997 | Chandley ................. 164/122.2 |
| 6,129,847 A | 10/2000 | Wunsch et al. |

FOREIGN PATENT DOCUMENTS

| | | |
|---|---|---|
| EP | 06340902 | 12/1994 |
| EP | 0 999 566 A | 5/2000 |
| EP | 2000198878 | 7/2000 |
| EP | 1 091 007 A | 4/2001 |
| JP | 5-55018 | 3/1993 |
| JP | 07111208 | 4/1995 |
| JP | 7-111208 | 4/1995 |
| JP | 10-55908 | 2/1998 |
| JP | 10055908 | 2/1998 |

OTHER PUBLICATIONS

N. Sato et al.. "Recovery of Samarium and Neodymium from Rare Earth Magnet Scraps by Fractional Crystallization Method", Fundamental study on the recycling of rare earth magnet (2$^{nd}$ report), p. 1082 (200)–1086 (2004).

European Search Report dated May 31, 2000, application No. 9912188432208.

*Primary Examiner*—Stephen J. Lechert, Jr.
(74) *Attorney, Agent, or Firm*—RatnerPrestia

(57) ABSTRACT

A recycling method of producing magnetic material powder from bonded magnets which are produced by mixing magnetic material powder, as raw material powder, with a binder and subjecting a mixture to molding forming, has at least the steps of:

(a) separating and collecting the magnetic material powder from the bonded magnets by removing all or a prescribed percentage of the binder contained in the magnets;

(b) removing all or a prescribed percentage of the particles of diameter smaller than a prescribed particle diameter from the separated and collected magnetic material powder; and (c) mixing the magnetic material powder, from which the particles of diameter smaller than the prescribed one are removed, with a virgin magnetic material powder in a prescribed mixing ratio, so as to produce a new raw material powder.

12 Claims, No Drawings

METHOD OF PRODUCING RECYCLED RAW MATERIAL POWDER FOR USE IN BONDED MAGNET AND METHOD OF RECYCLING BONDED MAGNET

BACKGROUND OF THE INVENTION

1. Field of the Invention

The present invention relates to materials-recovery-type recycling of bonded magnets which are excellent in dimensional accuracy and workability, therefore, widely used as an industrial material.

2. Related Art of the Invention

Hard magnetic material of any type is generally hard and brittle; moreover, its manufacturing process usually includes casting, sintering, heat treatment, and grinding finishing as a last step so as to produce a prescribed dimension. As a result, the processing cost becomes high for applications where close dimensional tolerance is required, which leads to a remarkable increase in the cost of product. In addition, with this material, intricate shapes and thin products are hard to make.

The hard magnetic material having been improved in the above disadvantages in processability and workability and having come into use is a bonded magnet. The bonded magnet is a magnet produced by mixing hard magnetic material powder with a binder, such as plastic and rubber, and subjecting the mixture to molding forming, and it is characterized in that it has a high dimensional accuracy, it is workable into an intricate shape and into a thin product, it is free from fear of cracking and chipping, and that it has a light weight.

The magnetic properties of the bonded magnets are inferior to those of cast magnets and sintered magnets since they contain 2 to 15 wt % binder of non-magnetic material (25 to 50% by volume); however, after powerful powders of magnetic materials such as rare earth permanent magnet were obtained, their properties have been rapidly improved and they have wider applications.

The particle size of the magnetic powder of, for example, rare earth permanent magnet is made uniform, the uniform powder is mixed with a binder, and the mixture is subjected to molding forming by the compression molding, injection molding, etc. In cases where the binder is a thermosetting resin, the molded form is subjected to thermosetting subsequently. In the bonded magnets, the density and the void largely affect the magnetic properties; accordingly, the particle size of the magnetic powder and the mixing ratio of the binder to the magnetic powder are important factors in improvement in the magnetic properties thereof.

On the other hand, since the bonded magnet is a mixture of a binder and magnetic material powder, it becomes much more difficult to decompose and recycle the used bonded magnets or bonded magnets rejected as defectives. In particular, in cases where the binder is a thermosetting resin, the bonded magnets are allowed to have a three-dimensional network structure by the setting reaction and generally to become insoluble and non-fusible solids; accordingly, these resin-set bonded magnets have been hard to decompose, and therefore, considered to be unfit for recovering and reusing.

Considering that the waste disposal problem is becoming more serious and the effective use of the resources is important, however, the development of volume reduction technology and of treatment technology for reusing is an urgent problem for the bonded magnets including those having been used as well as those having been rejected as defectives during the processes. In particular, the bonded magnets are composed of metals, metal oxides, etc., and metals are valuables which are more costly than resins which are used as a binder; accordingly, the fact that the possibility of recovering and reusing such costly valuables is limited becomes a bigger issue. In cases where the bonded magnets are composed of rare earth metals such as cobalt and neodymium, the issue becomes much bigger.

Thus, several investigations have been carried out of recycling the bonded magnets; however, for the bonded magnets using thermosetting resins such as epoxy resin as a binder, it is completely impossible to separate and decompose them. Therefore, the only approach taken for resources recovery has been to crush the bonded magnets, mix a small amount of crushed magnets with a virgin magnet powder, add a binder to the mixture, and subjecting the mixture to molding forming.

In the conventional method as above in which the bonded magnets are crushed, the magnet powder and the binder are not satisfactorily separated; therefore, if the mixing ratio of the recycled material to the virgin magnet powder is increased, the density of the bonded magnet, that is, the magnet powder content is decreased, which means that the bonded magnet having the same density as the conventional one cannot be obtained. This means the deterioration of magnetic properties.

In addition, the properties of the magnet powder tend to deteriorate when further pulverizing the raw material. In accordance with the conventional crushing method, since the pulverization of the magnet powder itself is inevitable, the magnetic properties of the bonded permanents magnets produced deteriorate.

Further, due to the pressure applied during the molding forming of the bonded magnets, the particle diameter of the magnet powder becomes smaller. In the conventional method, however, the binder and the magnet powder cannot be separated from each other, and the magnet powder is mixed and reused with its particle size remaining small, which also results in the deterioration of magnetic properties.

After all, the present situation is that the reclamation and resource recovery of the bonded magnets cannot be fully achieved by the conventional method.

SUMMARY OF THE INVENTION

Accordingly, in light of the problems described above, the object of the present invention is to provide a method of recycling bonded magnets having the same properties as the currently used one by separating magnetic materials from any type of bonded magnets.

One aspect of the present invention of the present invention is a recycling method of producing magnetic material powder from bonded magnets which are produced by mixing magnetic material powder, as raw material powder, with a binder and subjecting a mixture to molding forming, comprising at least the steps of:

(a) separating and collecting the magnetic material powder from the bonded magnets by removing all or a prescribed percentage of the binder contained in the magnets;

(b) removing all or a prescribed percentage of the particles of diameter smaller than a prescribed particle diameter from the separated and collected magnetic material powder; and (c) mixing the magnetic material powder, from which the particles of diameter smaller than the prescribed one are removed, with a virgin magnetic material powder in a prescribed mixing ratio, so as to produce a new raw material powder.

Another aspect of the present invention is a method of recycling bonded magnets produced by mixing magnetic material powder, as raw material powder, with a binder and subjecting a mixture to molding forming, comprising the steps. of:

(a) separating and collecting the magnetic material powder from the bonded magnets by removing all or a prescribed percentage of the binder contained in the magnets;

(b) removing all or a prescribed percentage of the particles of diameter smaller than a prescribed particle diameter from the separated and collected magnetic material powder;

(c) mixing the magnetic material powder, from which the particles of diameter smaller than the prescribed one are removed, with a virgin magnetic material powder in a prescribed mixing ratio, so as to produce a new raw material powder; and (d) mixing the newly produced raw material powder with a prescribed percentage of a binder and subjecting the mixture to molding forming.

Still another aspect of the present invention is the recycling method, wherein the prescribed percentage of the binder to be removed in the step (a) is determined in terms of the prescribed mixing ratio in the step (c).

Yet another aspect of the present invention is the recycling method, wherein the prescribed particle diameter in the step (b) is determined in terms of the prescribed mixing ratio in the step (c).

A further aspect of the present invention is the recycling method, wherein the prescribed ratio in the step (b) is determined in terms of the prescribed mixing ratio in the step (c).

A still further aspect of the present invention is the recycling method, wherein an average particle diameter of the virgin magnetic material powder in the step (c) is determined in terms of the prescribed mixing ratio in the step (c).

A yet further aspect of the present invention is the recycling, wherein the average particle diameter of the virgin magnetic material powder in the step (c) is larger than that of the magnetic material powder contained in the bonded magnets used in the step (a).

A still yet further aspect of the present invention is the recycling method, wherein the prescribed particle diameter in the step (b) set for $\phi 20$ to $100 \mu m$.

An additional aspect of the present invention is the recycling method, wherein the bonded magnets contain a thermoplastic resin as the binder and the step (a) is a step of dissolving and separating the binder with a solvent capable of solving the thermoplastic resin.

A still additional aspect of the present invention is the recycling method, wherein the step (a) comprises a step (e) of bringing the bonded magnets into contact with a decomposition solution containing a solvent capable of decomposing the binder in a decomposition bath and heating the decomposition bath to the temperature of 200° C. or higher and lower than the critical temperature of the solvent.

A yet additional aspect of the present invention is the recycling method, wherein the solvent in the step (e) is at least one selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone.

A still yet additional aspect on of the present invention is the recycling method, wherein the mixing ratio of the binder in the step (d) is made smaller than that of the binder of the bonded magnets used in the step (a).

PREFERRED EMBODIMENTS OF THE INVENTION

The bonded magnets provided for the recycling method of the present invention are magnets molded using plastic, rubber, etc. as a binder. In those bonded magnets, prior to molding forming, the magnetic material powder is mixed with the binder. And the bonded magnets are classified depending on the types of the binder and magnetic material powder used. The bonded magnet using a plastics material as a binder is referred to as plastic bonded magnet, and the plastics materials used include, for example, nylon resin, polyphenylene sulfide and epoxy resin. In cases where thermosetting resins such as epoxy resin are used as binders, they are thermoset after the molding forming process. As a magnetic material powder, mainly used are an oxide magnet and a rare earth permanent magnet. As an oxide magnet used are alnico magnet and ferrite magnet, and as a rare earth permanent magnet used are rare earth cobalt alloys, such as $SmCo_5$, $SmT_{17}$ alloy, and neodymium base alloy such as $Nd_2Fe_{14}B$.

In the bonded magnets, the density and percentage of void affect largely their magnetic properties. Accordingly, when producing the bonded magnets, it is important to regulate the particle size of the magnetic material powder used and the amount of the binder used. The magnetic material powder of which particle size is too small cannot contribute to the magnetic properties of the bonded magnet molded therefrom.

In the bonded magnets molded from magnetic material powder as a raw material powder after mixing the same with a binder, their density is increased due to the pressure applied during molding forming by the injection molding, compression molding, etc. and their void is filled with the binder; accordingly, their magnetic properties are allowed to be excellent. The magnetic material powder once molded into bonded magnets is, however, crushed by the pressure applied during the molding forming, and the particle size of the magnetic material powder separated and collected from the bonded magnets is generally small compared with that of a virgin magnetic material powder.

If the powder having such a small particle size is mixed with a virgin magnetic material powder so as to provide a raw material powder and again molded into a bonded magnet with a binder mixed therein, the magnetic properties of the bonded magnet thus obtained deteriorate because the smaller particles exist which do not contribute to the improvement in magnetic properties or because the density cannot be regulated optimally, and they fell short of our expectations.

According to the present invention, the method of recycling bonded magnets, which are produced by mixing magnetic material powder, as raw material powder, with a binder and subjecting the mixture to molding forming, includes at least the steps of: (a) separating and collecting the magnetic material powder from the bonded magnets by removing therefrom as much binder as possible; (b) removing from the separated and collected magnetic material powder as many particles of diameter less than a prescribed one as possible; (c) mixing the magnetic material powder obtained in the step (b) with a virgin magnetic material powder so as to provide a new raw material powder; and (d) mixing the raw material powder obtained in the step (c) with an additional amount of binder and subjecting the mixture to molding forming.

In the step (c), as many particles of diameter less than a prescribed one as possible are removed from the magnetic material powder separated and collected in the step (b) before mixing the powder with a virgin magnetic material powder. Thus, the particles which have been made smaller by the crushing action of the pressure applied during the molding forming, and therefore, do not contribute to the magnetic properties of the bonded magnets can be removed, in addition, the density of the bonded magnets can be regulated when mixing the magnetic material powder obtained in the step (b) with a virgin magnetic material powder.

Accordingly, the magnetic properties of the bonded magnets are improved and the recycled bonded magnets can be obtained which have the properties equivalent to those of the bonded magnets produced by mixing a virgin magnetic material powder with a binder and subjecting the mixture to molding forming.

The average particle diameter of the virgin magnetic material powder used in the step (c) is larger than that of the magnetic material powder contained in the bonded magnets used in the step (a). In addition, according to the present invention, in the step (c), the average particle diameter of the virgin magnetic material powder, which is mixed with the separated and collected magnetic material powder, is allowed to be larger than that of the magnetic material powder contained in the bonded magnets used in the step (a).

For the magnet powder separated and collected from the bonded magnets once produced through the molding forming process, its particle size is generally smaller than that of the raw material magnetic powder in the first stage due to the crushing action of the pressure applied during the molding forming. The particle diameter distribution, however, can be much more optimized by classifying the particles of the magnet powder and mixing the powder of the classified particles with a virgin magnetic material powder of particle diameter larger than that of the magnet powder. As a result, the magnetic properties of the bonded magnets are improved, and in spite of the use of the separated and collected magnetic material powder, the bonded magnets obtained are allowed to have the properties equivalent to those of the bonded magnets produced by mixing a purely virgin magnetic material powder, as raw material powder, with a binder and subjecting the mixture to molding forming.

For the bonded magnets produced using a thermoplastic resin as a binder, the separating operation in the step (a) can be carried out by the dissolution separation with a solvent capable of dissolving the thermoplastic resin.

As a binder of thermoplastic resin, used are, for example, nylon resin and polyphenylene sulfide. The solvents capable of dissolving thermoplastic resins and being provided for the dissolution separation of the step (a) include, for example, solvents such as acetone, acetylacetone, acetaldehyde, ethyl acetoacetate, methyl acetoacetate, methyl ethyl ketone, diethyl ketone, methyl isobutyl ketone, methyl isopropyl ketone, dimethyl sulfoxide, dimethylformamide, ethyl acetate, isopropyl acetate, butyl acetate, tetrahydrofuran, dioxane, diethyl ether, water, ethanol, methanol, toluene, chloroform, dichloromethane, cresol, phenol, resorcinol, formic acid, glutaric acid, sulfuric acid, phosphoric acid and nitroalcohol; alcohol halide, alcohol solution of alkali metal halide alcohol solution of alkaline earth metal halide, alcohol solution of rhodanic acid, 70% chloral hydrate, monohydroxy cyanide, ethylene glycol and benzyl alcohol.

The solvent used may be a mixed solvent consisting of a plurality of solvents. And heat may be applied so as to dissolve the thermoplastic resins. For polyphenylene sulfide, its solubility in solvent is low at room temperature, therefore, preferably it is dissolved by applying heat about 200° C. or higher.

The step (a) preferably includes a step of: bringing the bonded magnets into contact with a decomposition solution containing a solvent capable of decomposing the matter having been set by thermosetting resins in a decomposition bath while heating the bonded magnets at a temperature 200° C. or higher and lower than the critical temperature of the solvent.

In this case, as the solvent used is at least one selected from the group consisting of ethylene glycol, propylene glycol, diethylene glycol, dipropylene glycol, isoprene glycol, triethylene glycol, 2-methoxyethanol, 2-ethoxyethanol, 2-(methoxy methoxy)ethanol, 2-isopropoxyethanol, 2-butoxyethanol, 2-(isopentyloxy) ethanol, 2-(hexyloxy)ethanol, 2-phenoxyethanol, 2-(benzyloxy)ethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetraethylene glycol, tetralin, biphenyl, naphthalene, methylnaphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone.

The binder is subjected to chemical decomposition by immersing and heating the bonded magnets in the decomposition solution containing at least one solvent selected from the group consisting of ethylene giycol, propylene glycol, diethylene glycol, dipropylene glycol, isoprene glycol, triethylene glycol, 2-methoxyethanol, 2-ethoxyethanol, 2-(methoxy methoxy)ethanol, 2-isopropoxyethanol,. 2-butoxyethanol, 2-(isopentyloxy) ethanol, 2-(hexyloxy)ethanol, 2-phenoxyethanol, 2-(benzyloxy)ethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether and tetraethylene glycol.

Even if the binder is a thermosetting resin such as epoxy resin, the three-dimensional cross-linked chains are subjected to chemical decomposition.

The solvents such as tetralin, biphenyl, naphthalene, methylnaphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone become a liquid phase satisfactory for the decomposition of binders when applying heat, and the liquid phase thermal decomposition reaction of a binder progresses effectively. In this case, even if the binders are the thermosetting resins such as epoxy resin, which are hard to decompose by the conventional methods, they can be decomposed effectively.

Once the binder is decomposed, its function of bonding the bonded magnet having been subjected to setting deteriorates, which results in the disintegration of the bonded magnet. In other words, the bonded magnet becomes unable to hold the magnet powder having been restrained by the binder. Thus the binder components and the magnet powder become easy to separate from each other.

The step (a) allows the binder, including an epoxy resin which is a thermosetting resin having been hard to decompose, to be easily decomposed. And after the decomposition, the magnet powder can be separated and collected from the bonded magnet.

In the steps described above, in order to obtain a high decomposition reaction rate, the temperature is preferably high at which the bonded magnets are brought into contact with a decomposition solution. The reaction rate is acceleratedc sharply, in particular, at 250° C. or higher (refer to, for example, Japanese Patent Laid-Open No. 12-198878). However, raising the temperature too high gives rise to problems that: a highly pressure-resistant reactor is required because the pressure becomes too high; the magnet powder becomes hard to collect because the gaseous product caused by the decomposition is increased; the decomposition solution itself may be decomposed; and deterioration reactions such as oxidation of magnet are activated. Accordingly, the temperature at which the bonded magnets are immersed in the decomposition solution is preferably lower than the critical temperature of the solvent contained in the decomposition solution.

For example, the critical temperature of propylene glycol is 351° C. As described above, preferably the temperature at which the bonded magnets are brought into contact with the decomposition solution is 200° C. or higher and lower than the critical temperature of the solvent used. Meanwhile the inventors found that the reaction rate can be accelerate at even 200° C.

In the step (d), the mixing ratio of the binder to the mixed raw material powder is made smaller than that of the binder to the bonded magnet in the step (a) The reason is as follows.

The binder functions to bond the magnet powder; however, the use of too small an amount of binder does not permit the void among the powder particles to be filled in, on the other hand, the use of too large an amount of binder only results in decrease in the density of the bonded magnet. Either case provides optimal magnetic properties.

In the step (a), although it is best to separate and collect 100% of the magnetic material powder from the bonded magnets, the magnetic material powder can sometimes be separated in such a state that part of it holds a slight amount of binder. In that case, in the step (d), the magnetic material powder is mixed with an additional amount of binder and subjected to molding forming in such a state that part of it holds a slight amount of binder. In such a situation, since the binder more than the optimal amount is mixed with the magnetic material powder, the bonded magnets newly produced cannot exhibit optimal magnetic properties.

Therefore, The mixing ratio of the binder to the raw material powder containing the separated and collected magnetic material powder is made smaller than that of the binder to the bonded magnets used in the step (a). This allows the density of the magnetic material to be larger and the magnetic properties to be improved.

The present invention will be described in further detail with reference to the following embodiments.

Embodiment 1

One embodiment of the method of recycling bonded magnets according to the present invention will be described below.

In this embodiment, a method of decomposing bonded magnets according to the present invention will be described taking the case where the bonded magnets are produced by agglomerating and setting rare earth permanent magnet powder using an epoxy resin as a binder.

The rare earth permanent magnets include, for example, SmCo magnet; however, this embodiment will be described taking Nd—Fe—B magnet for example.

A bonded magnet was obtained by kneading the Nd—Fe—B magnet powder as a raw material powder and 3% by weight of epoxy resin, molding the mixture into ring shape by the compression molding, and thermosetting the molding. The bonded magnet thus obtained was used as a test specimen.

The ring-shaped bonded magnet was subjected to decomposition treatment by bringing into contact with a decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone. In this embodiment, a decomposition solution consisting of tetralin was used. The bonded magnet was immersed in the decomposition solution and placed into a decomposition bath, then it was heated together with the decomposition bath at 300° C. for 3 hours.

As a result, the resin as a binder was completely decomposed and dissolved or dispersed in the decomposition solution while the magnet powder was settled on the bottom of the decomposition bath.

Then, the magnetic material powder settled in the decomposition solution was collected and mixed with a virgin magnetic material powder. Prior to the mixing, the magnetic material powder separated and collected was classified with respect to the classifying point of 53 μm, and as many particles of diameter smaller than 53 μm as possible were removed so as to increase the average diameter. The magnetic material powder with a larger average diameter was mixed with the virgin magnetic material powder in the ratio by weight of 50 to 50. For comparison, the magnetic material powder not having been subjected to classification was also mixed with the virgin magnetic material powder in the ratio by weight of 50 to 50. The particle size distributions are shown in Table 1 for the raw material powder newly obtained by mixing the separated and collected magnetic material powder and the virgin magnetic material powder, the virgin magnetic material powder and the separated and collected magnetic material powder, respectively.

TABLE 1

| Particle Size ($\mu$m) | Raw Material Magnet Powder (A) | Magnet Powder Collected After Decomposition (B) | A + Classified B (50:50) | A + B (50:50) |
|---|---|---|---|---|
| >250 | 2 | 1 | 2 | 2 |
| 150~250 | 5 | 2 | 4 | 4 |
| 120~150 | 14 | 5 | 12 | 10 |
| 100~120 | 26 | 12 | 24 | 19 |
| 75~100 | 31 | 19 | 33 | 25 |
| 53~75 | 13 | 14 | 20 | 14 |
| 20~53 | 7 | 31 | 4 | 19 |
| <20 | 2 | 16 | 1 | 9 |

Then, after kneading each of the two types of newly obtained raw material powder and 3% by weight of epoxy resin again, the two mixtures were molded into ring shape by the compressing molding and subjected to thermosetting so as to obtain bonded magnets. The magnetic properties were measured for each of the bonded magnets.

The density and the maximum magnetic energy product of each of the bonded magnets newly obtained and that before decomposition are shown in Table 2.

For the bonded magnets produced from the mixture of the magnet powder, which was separated and collected from the bonded magnets and subjected to classification, and a virgin magnetic material powder, its density was close to that of the bonded magnet before decomposition and its maximum magnetic energy product was also almost close to that of the same.

For the bonded magnets produced from the mixture of the magnet powder, which was separated and collected from the bonded magnets but not subjected to classification, and a virgin magnetic material powder, both its density and maximum magnetic energy product were smaller than those of the bonded magnet before decomposition. The other magnetic properties showed a similar tendency. Thus, the newly produced bonded magnets are allowed to have improved magnetic properties which are equivalent to those of the bonded-magnet before decomposition by subjecting the separated and collected magnetic material powder to classification and removing as many particles of diameter less than that of a prescribed one as possible before mixing with the virgin magnetic martial powder.

TABLE 2

| | Raw Material Magnet Powder (A) | A + Classified B (50:50) | A + B (50:50) |
|---|---|---|---|
| Density (g/cm$^3$) | 6.02 | 5.99 | 5.75 |
| Maximum Magnetic Energy Product (MGOe) | 9.85 | 9.80 | 9.41 |

In regard to the composition and construction of the bonded magnets using an epoxy resin as a binder, the present invention is not intended to be limited to the values presented in this embodiment. The binder may be some other resin or rubber, and the magnetic material powder may be a rare earth permanent magnet, an alnico magnet, etc.

In regard to the magnetic material powder as raw material powder, the present invention is not intended to be limited to the particle size distributions presented in this embodiment. And in regard to the separated and collected magnetic material powder, the present invention is not intended to be limited to the classification presented in this embodiment.

Further, in regard to the temperature during the decomposition treatment, it goes without saying that the present invention is not intended to be limited to the values presented in this embodiment. The present invention is applicable to the decomposition temperature 250° C. or higher and lower than the critical temperature of the solvent.

In this embodiment, although ethylene glycol was taken for example of the decomposition solution, the present invention is intended to be limited to the composition and compound ratio as described above. The present invention is applicable to the decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone.

In the present invention, in order to prevent oxidation deterioration of the solvent or magnet powder, a step of removing oxygen from the decomposition bath may be provided prior to the decomposition step for separating magnet powder. One example of the processes for removing oxygen is such that nitrogen is sent to the decomposition bath to be substituted for the gas in the decomposition bath including the decomposition solution. Nitrogen may be sent from a nitrogen gas cylinder directly to the decomposition bath by providing a gas introducing pipe and an exhaust valve to the de composition bath in which the resin-set bonded magnets and the decomposition solution have been already placed. Alternatively, the process to evacuate the decomposition bath may be used. In order to evacuate the decomposition bath, an exhaust valve should be provided to and a vacuum pump should be installed in the decomposition bath in which the resin-set bonded magnets and the decomposition solution have been already placed. In both cases, oxygen can be removed more effectively by stirring the decomposition solution and moderately heating the same.

The preferable process is first to sent nitrogen to the decomposition bath so as to be substitute for the gas therein, then to evacuate the decomposition bath.

Conducting the decomposition treatment after conducting the pretreatment for removing oxygen from the decomposition bath enables the prevention of oxidation, which is the main cause of the deterioration of the decomposition solution during the high-temperature reaction treatment, and also enables the increase in the life of the decomposition solution, and hence the improvement in the endurance to repeated use. This also prevents the oxidation deterioration of the alloys constituting the magnet powder of the bonded magnets; accordingly, the quality of the separated and collected magnet powder can also be improved. Since rare earth metals such as neodymium are particularly susceptible to oxidation, this pretreatment step is effective in maintaining the quality of the magnet powder after the decomposition treatment.

In the decomposition treatment process of the present invention, in order to prevent the oxidation deterioration of the solvent or the oxidation deterioration of the metals constituting the magnets, an antioxidant or a reducing agent can be added directly to the decomposition solution.

As the antioxidant or the reducing agent, preferably used is at least one selected from the group consisting of hydroquinone, methoquinone, benzoquinone, naphthoquinone, butylcatechol, butylhydroquinone, sodium hypophosphite, sodium thiosulfate and ascorbic acid.

These antioxidants or the reducing agents are easy to provide to the decomposition solution because they are satisfactorily soluble in the decomposition solution of the present invention, and their effect is considerable.

In the decomposition treatment process of the present invention, a step may be added of washing the magnetic material powder, which was separated and collected after the decomposition treatment, with solvents such as acetone. In addition, in order to fully remove the decomposed resin remaining in the magnetic material powder and the solvent attached to the same even after the decomposition and collection or the washing, a step of drying may be added. Adding both of these steps enables removing the impurities attached to the separated and collected magnetic material powder more completely, and hence improving the magnetic properties of the bonded magnets newly molded.

The repeatedly used decomposition solution can be reused by removing the matter dissolved therein or can be used as. an oil fuel as it is.

Embodiment 2

Another embodiment of the method of recycling bonded magnets according to the present invention will be described below.

In this embodiment, a method of the present invention will be described taking the case where the bonded magnets are produced by agglomerating and setting rare earth permanent magnet powder using a nylon resin as a binder.

The rare earth permanent magnets include, for example, SmComagnet; however, this embodiment will be described taking Nd—Fe—B magnet for example.

A bonded magnet was obtained by kneading the Nd—Fe—B magnet powder as a raw material powder and 7% by weight of nylon resin and by molding the mixture into ring shape by the injection molding. The bonded magnet thus obtained was used as a test specimen.

The Nd—Fe—B magnet powder could be collected by the following steps of: immersing the ring-shaped bonded magnet in cresol so as to dissolve the nylon resin, as the binder, therein; separating the insoluble Nd—Fe—B magnet powder, as the raw material powder by, or example, filtration; and drying the separated Nd—Fe—B magnet powder. This Nd—Fe—B magnet powder can be reused again as a bonded magnet or as a sintered magnet.

Then, the magnetic material powder collected was mixed with a virgin magnetic material powder. Prior to the mixing, the magnetic material powder separated and collected was classified with respect to the classifying point of 35 $\mu$m, and as many particles of diameter smaller than 35 $\mu$m as possible were removed so as to increase the average diameter. The magnetic material powder with a larger average diameter was mixed with the virgin magnetic material powder in the ratio by weight of 60 to 40. For comparison, the magnetic material powder not having been subjected to classification was also mixed with the virgin magnetic material powder in the ratio by weight of 60 to 40. The particle size distributions are shown in Table 3 for the raw material powder newly obtained by mixing the separated and collected magnetic material powder and the virgin magnetic material powder, the virgin magnetic material powder and the separated and collected magnetic material powder, respectively.

TABLE 3

| Particle Size ($\mu$m) | Raw Material Magnet Powder (A) | Separated and Collected Magnet Powder (B) | A + Classified B (40:60) | A + B (40:60) |
|---|---|---|---|---|
| >250 | 2 | 1 | 2 | 1 |
| 150~250 | 5 | 2 | 4 | 3 |
| 120~150 | 14 | 4 | 9 | 8 |
| 100~120 | 26 | 12 | 21 | 18 |
| 75~100 | 31 | 20 | 30 | 24 |
| 53~75 | 13 | 14 | 18 | 14 |
| 20~53 | 7 | 33 | 16 | 23 |
| <20 | 2 | 14 | 1 | 9 |

Then, after kneading each of the two types of newly obtained raw material powder and 7% by weight of nylon resin again, the two mixtures were molded into ring-shaped bonded magnets. The magnetic properties were measured for each of the bonded magnets.

The density and the maximum magnetic energy product of each of the bonded magnets newly obtained and that before decomposition are shown in Table 4. For the bonded magnets produced from the mixture of the magnet powder, which was separated from the bonded magnets and subjected to classification, and a virgin magnetic material powder, its density was close to that of the bonded magnet before decomposition and its maximum magnetic energy product was also almost close to that of the same.

For the bonded magnets produced from the mixture of the magnet powder, which was separated from the bonded magnets but not subjected to classification, and a virgin magnetic material powder, both its density and maximum magnetic energy product were considerably smaller than those of the bonded magnet before decomposition. The other magnetic properties showed a similar tendency. Thus, the newly produced bonded magnets are allowed to have improved magnetic properties which are equivalent to those of the bonded magnet before decomposition by subjecting the separated and collected magnetic material powder to classification and removing as many particles of diameter less than that of a prescribed one as possible before mixing with the virgin magnetic material powder.

TABLE 4

|  | Raw Material Magnet Powder (A) | A + Classified B (40:60) | A + B (40:60) |
|---|---|---|---|
| Density (g/cm³) | 6.02 | 5.94 | 5.68 |
| Maximum Magnetic Energy Product (MGOe) | 9.85 | 9.72 | 9.29 |

In regard to the composition and construction of the bonded magnets using a nylon resin as a binder, the present invention is not intended to be limited to the values presented in this embodiment. The binder may be some other resin or rubber, and the magnetic material powder may be a rare earth permanent magnet, an alnico magnet, etc.

In regard to the magnetic material powder as raw material powder, the present invention is not intended to be limited to the particle size distributions presented in this embodiment. And in regard to the separated and collected magnetic material powder, the present invention is not intended to be limited to the classification presented in this embodiment.

Further, in regard to the solvent used for dissolving and separating the binder, the present invention is not intended to be limited to cresol used in this embodiment. The solvents such as phenol, resorcinol, formic acid, glutaric acid, sulfuric acid, phosphoric acid and nitroalcohol; the solvents such as alcohol halide, alcohol solution of alkali metal halide, alcohol solution of alkaline earth metal halide, alcohol solution of rhodanic acid, 70% chloral hydrate, monohydroxy cyanide; and the mixture thereof may be used. And heat may be applied so as to help the binder dissolving in the solvent during dissolving and separating operation. The solvents such as methanol, ethylene glycol, benzyl alcohol, dimethyl sulfoxide and dimethylformamide may also be used as long as they are heated to about 130° C.

In the cases where the thermoplastic resins other than nylon resin of this embodiment are used as the binders, as the solvent used in dissolving and separating operation, the solvents such as acetone, acetylacetone, acetaldehyde, ethyl acetoacetate, methyl acetoacetate, methyl ethyl ketone, diethyl ketone, methyl isobutyl ketone, methyl isopropyl ketone, dimethyl sulfoxide, dimethylformamide, methyl acetate., ethyl acetate, isopropyl acetate, butyl acetate, tetrahydrofuran, dioxane, diethyl ether, dichloromethane, chloroform, toluene, cresol, methanol, ethanol and water and the mixture thereof may be used.

In the decomposition treatment process of the present invention, a step may be added of washing the magnetic material powder separated-and collected by the dissolving and separating operation with solvents such as acetone. In addition, in order to fully remove the resin remaining in and the solvent attached to the magnetic material powder after the decomposition and collection or the washing, a step of drying may be added. Adding any one of these steps enables removing the impurities attached to the separated and collected magnetic material powder more completely, and hence improving the magnetic properties of the bonded magnets newly molded.

The solvent repeatedly used for dissolving and separating the binder can be reused by removing the matter dissolved therein or can be used as an oil fuel as it is. And the resin once dissolved in the solvent and removed therefrom can be reused as a binder for the bonded magnets.

Embodiment 3

Another embodiment of the method of recycling bonded magnets according to the present invention will be described below.

In this embodiment, a method of the present invention will be described taking the case where the bonded magnets are produced by agglomerating and setting rare earth permanent magnet powder using an epoxy resin as a binder.

The rare earth permanent magnets include, for example, SmCo magnet; however, this embodiment will be described taking Nd—Fe—B magnet for example.

A bonded magnet was obtained by kneading the Nd—Fe—B magnet powder as a raw material powder and 3% by weight of epoxy resin and by molding the mixture into-ring shape by the compression molding. The bonded magnet thus obtained was used as a test specimen.

The ring-shaped bonded magnet was subjected to decomposition treatment by bringing into contact with a decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone. In this embodiment, a decomposition solution consisting of tetralin was used. The bonded magnet was immersed in the decomposition solution and placed into a decomposition bath, then it was heated together with the decomposition bath at 300° C. for 3 hours.

As a result, the resin as a binder was completely decomposed and dissolved or dispersed in the decomposition solution while the magnet powder was settled on the bottom of the decomposition bath.

Then, the magnetic material powder settled in the decomposition solution was collected and mixed with a virgin magnetic material powder. Prior to the mixing, the magnetic material powder separated and collected was classified with respect to the classifying point of 53 μm, and as many particles of diameter smaller than 53 μm as possible were removed. The magnetic material powder was mixed with the virgin magnetic material powder in the ratio by weight of 70 to 30. In this embodiment, prior to the mixing, a step was added of increasing the average diameter of the virgin magnetic material powder to 118 μm, which was larger than that (103 μm) of the bonded magnets as a specimen, by classifying the virgin magnetic material powder with respect to the classifying point of 75 μm. After completing each classification, the separated and collected magnetic material powder and the virgin magnetic material powder were mixed in the ratio by weight of 70 to 30.

For comparison, the virgin magnetic material powder and the separated and collected magnetic material powder, both of which were not subjected to classification, were also mixed in the ratio by weight of 70 to 30. The particle size distributions are shown in Table 5 for the raw material powder newly obtained by mixing the separated and collected magnetic material powder and the virgin magnetic material powder, the virgin magnetic-material powder and the separated and collected magnetic material powder, respectively.

TABLE 5

| Particle Size (μm) | Raw Material Magnet Powder (A) | Separated and Collected Magnet Powder (B) | A + Classified B (30:70) | Classified A + Classified B (30:70) | A + B (30:70) |
|---|---|---|---|---|---|
| >250 | 2 | 1 | 2 | 2 | 1 |
| 150~250 | 5 | 2 | 4 | 4 | 3 |
| 120~150 | 14 | 5 | 8 | 10 | 8 |
| 100~120 | 26 | 12 | 20 | 22 | 18 |
| 75~100 | 31 | 19 | 30 | 33 | 23 |
| 63~75 | 13 | 14 | 18 | 14 | 14 |
| 20~53 | 7 | 31 | 18 | 15 | 24 |
| <20 | 2 | 16 | 1 | 0 | 12 |

Then, after kneading each of the three types of newly obtained raw material powder and 3% by weight of epoxy resin, the three mixtures were molded into ring shape by the compressing molding and subjected to thermosetting so as to obtain bonded magnets. The magnetic properties were measured for each of the bonded magnets.

The density and maximum magnetic energy product of each of the bonded magnets newly obtained and those of the bonded magnet before decomposition treatment are shown in Table 6. For all the bonded magnets produced from the magnet powder having been subjected to classification, the magnetic properties were excellent compared with those of the bonded magnets produced from the magnet powder not all having been subjected to classification. The effect of the classification in improving the magnetic properties can be observed. When comparison is made between the bonded magnets produced from the magnet powder having been subjected to classification, it is apparent that the bonded magnet produced from the separated and collected magnet powder and the virgin magnetic material powder, both of which were subjected to classifying, was allowed to have more excellent magnetic properties.

TABLE 6

| | Raw Material Magnet Powder (A) | A + B (30:70) | A + Classified B (30:70) | Classified A + Classified B (30:70) |
|---|---|---|---|---|
| Density (g/cm³) | 6.02 | 5.61 | 5.86 | 5.95 |
| Maximum Magnetic Energy Product (MGOe) | 9.85 | 9.18 | 9.59 | 9.74 |

As can be seen from Table 6, for the bonded magnet produced from the mixture of the magnet powder, which was separated and collected from the bonded magnets and subjected to classification, and a virgin magnetic material powder, its density was close to that of the bonded magnets before decomposition and its maximum magnetic energy product was also almost close to that of the same. However, the bonded magnet was allowed to have more excellent magnetic properties which are equivalent to those of the bonded magnet before decomposition by making an average diameter of the virgin magnetic material powder to be mixed larger.

In regard to the composition and construction of the bonded magnets using an epoxy resin as a binder, the present invention is not intended to be limited to the values presented in this embodiment. The binder may be some other resin or rubber, and the magnetic material powder may be a rare earth permanent magnet, an alnico magnet, etc.

In regard to the magnetic material powder as raw material powder, the present invention is not intended to be limited to the particle size distributions presented in this embodiment. And in regard to the separated and collected magnetic material powder, the present invention is not intended to be limited to the classification presented in this embodiment.

Further, in regard to the temperature during the decomposition treatment, it goes without saying that the present invention is not intended to be limited to the values presented in this embodiment. The present invention is applicable to the decomposition temperature 200° C. or higher and lower than the critical temperature of the solvent.

In this embodiment, although ethylene glycol was taken for example of the decomposition solution, the present invention is intended to be limited to the composition and compound ratio as described above. The present invention is applicable to the decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone.

In the present invention, in order to prevent oxidation deterioration of the solvent or magnet powder, a step of removing oxygen from the decomposition bath may be provided prior to the decomposition treatment step for separating magnet powder. One example of the processes for removing oxygen is such that nitrogen is sent to the decomposition bath to be substituted for the gas in the decomposition bath including the decomposition solution. Nitrogen may be sent from a nitrogen gas cylinder directly to the decomposition bath by providing a gas introducing pipe and an exhaust valve to the decomposition bath in which the resin-set bonded magnets and the decomposition solution have been already placed. Alternatively, the process to evacuate the decomposition bath may be used. In order to evacuate the decomposition bath, an exhaust valve should be provided to and a vacuum pump should be installed in the decomposition bath in which the resin-set bonded magnets and the decomposition solution have been already placed. In both cases, oxygen can be removed more effectively by stirring the decomposition solution and moderately heating the same.

The preferable process is first to sent nitrogen to the decomposition bath to be substituted for the gas therein, then to evacuate the decomposition bath.

Conducting the decomposition treatment after conducting the pretreatment for removing oxygen from the decomposition bath enables the prevention of oxidation, which is the main cause of the deterioration of the decomposition solution during the high-temperature reaction treatment, and also enables the increase in the life of the decomposition solution, and hence the improvement in the endurance to repeated use. This also prevents the oxidation deterioration of the alloys constituting the magnet powder of the bonded magnets; accordingly, the quality of the separated and collected magnet powder can also be improved. Since rare earth metals such as neodymium are particularly susceptible to oxidation, this pretreatment step is effective in maintaining the quality of the magnet powder after the decomposition treatment.

In the decomposition treatment process of the present invention, in order to prevent the oxidation deterioration of the solvent or the oxidation deterioration of the metals constituting the magnets, an antioxidant or a reducing agent can be added directly to the decomposition solution.

As the antioxidant or the reducing agent, preferably used is at least one selected from the group consisting of hydroquinone, methoquinone, benzoquinone, naphthoquinone, butylcatechol, butylhydroquinone, sodium hypophosphite, sodium thiosulfate and ascorbic acid.

These antioxidants or the reducing agents are easy to provide to the decomposition solution because they are satisfactorily soluble in the decomposition solution of the present invention, and their effect is considerable.

In the decomposition treatment process of the present invention, a step may be added of washing the magnetic material powder, which was separated and collected after the decomposition treatment, with solvents such as acetone. In addition, in order to fully remove the decomposed resin remaining in the magnetic material powder and the solvent attached to the same even after the decomposition and collection or the washing, a step of drying may be added. Adding both of these steps enables removing the impurities attached to the separated and collected magnetic material powder more completely, and hence improving the magnetic properties of the bonded magnets newly molded.

The repeatedly used decomposition solution can be reused by removing the matter dissolved therein or can be used as an oil fuel as it is.

Embodiment 4

Another embodiment of the method of recycling bonded magnets according to the present invention will be described below.

In this embodiment, a method of the present invention will be described taking the case where the bonded magnets are produced by agglomerating and setting rare earth permanent magnet powder using an epoxy resin as a binder.

The rare earth permanent magnets include, for example, SmCo magnet; however, this embodiment will be described taking Nd—Fe—B magnet for example.

A bonded magnet was obtained by kneading the Nd—Fe—B magnet powder as a raw material powder and 3% by weight of epoxy resin and by molding the mixture into ring shape by the compression molding. The bonded magnet thus obtained was used as a test specimen.

The ring-shaped bonded magnet was subjected to decomposition treatment by bringing into contact with a decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone. In this embodiment, a decomposition solution consisting of tetralin was used. The bonded magnet was immersed in the decomposition solution and placed into a decomposition bath, then it was heated together with the decomposition bath at 300° C. for 3 hours.

As a result, the resin as a binder was completely decomposed and dissolved or dispersed in the decomposition solution while the magnet powder was settled on the bottom of the decomposition bath.

Then, the magnetic material powder settled in the decomposition solution was collected and mixed with a virgin magnetic material powder.

Prior to the mixing, the separated and collected magnetic material powder was subjected to classification so as to remove as many particles of diameter smaller than a prescribed one, as described later, as possible. Then the classified magnetic material powder was mixed with a virgin magnetic material powder in the ratio by weight of 50 to 50.

A bonded magnet was obtained by kneading the above mixed material powder and 3% by weight of epoxy resin again, molding the mixture into ring shape by the compression molding, and thermosetting the molding.

The classification of the separated and collected magnetic material powder was conducted for each case where the prescribed particle diameter was set for 10, 20, 53, 100, 120 and 150 μm. The magnetic properties of the bonded magnets obtained after respective classification were measured and compared. The particle size distributions are shown in Table 7 for the classified raw material particles, the virgin magnetic material powder and the separated and collected magnetic material powder.

TABLE 7

| Particle Size (μm) | Raw Material Magnet Powder | Separated and Collected Magnet Powder | Classifying Points (μm) | | | | | |
|---|---|---|---|---|---|---|---|---|
| | | | 10 | 20 | 53 | 100 | 120 | 150 |
| >250 | 2 | 1 | 2 | 2 | 2 | 4 | 7 | 18 |
| 150~250 | 5 | 2 | 4 | 4 | 4 | 8 | 15 | 36 |
| 120~150 | 14 | 5 | 10 | 10 | 12 | 20 | 38 | 7 |
| 100~120 | 26 | 12 | 19 | 20 | 24 | 43 | 13 | 13 |
| 75~100 | 31 | 19 | 25 | 27 | 33 | 16 | 16 | 16 |
| 53~75 | 13 | 14 | 14 | 15 | 20 | 7 | 7 | 7 |
| 20~53 | 7 | 31 | 19 | 22 | 4 | 4 | 4 | 4 |
| <20 | 2 | 16 | 8 | 1 | 1 | 1 | 1 | 1 |

The density and the maximum magnetic energy product of each of the 6 types of bonded magnets newly obtained and those of the bonded magnet before decomposition treatment are shown in Table 8. For the bonded magnets produced from the magnet powder having been classified with respect to the classification points of 20, 53 and 100 μm, both density and the maximum magnetic energy product were relatively high values equivalent to those of the bonded magnet before the decomposition treatment. However, for those produced from the magnet powder having been classified with respect to the classification points of as small as 10 μm and as large as 120, 150 μm, both density and maximum magnetic energy product were relatively small compared with those of the bonded magnet before decomposition treatment.

TABLE 8

| | Raw Material Magnet Powder | Classifying Points (μm) | | | | | |
|---|---|---|---|---|---|---|---|
| | | 10 | 20 | 53 | 100 | 120 | 150 |
| Density (g/cm³) | 6.02 | 5.79 | 5.91 | 5.99 | 5.93 | 5.82 | 5.80 |
| Maximum Magnetic Energy product (MGOe) | 9.85 | 9.47 | 9.67 | 9.80 | 9.70 | 9.52 | 9.49 |

As can be seen from Table 8, the magnetic properties of the bonded magnet are improved by introducing a step of classifying the separated and collected magnet powder, so as to remove as many particles of diameter smaller than the set classifying point as possible, and the classifying point in the pretreatment process is preferably in the range of 20 to 100 μm.

In regard to the composition and construction of the bonded magnets using an epoxy resin as a binder, the present invention is not intended to be limited to the values presented in this embodiment. The binder may be some other resin or rubber, and the magnetic material powder may be a rare earth permanent magnet, an alnico magnet, etc.

In regard to the magnetic material powder as raw material powder, the present invention is not intended to be limited to the particle size distributions presented in this embodiment. And in regard to the separated and collected magnetic material powder, the present invention is not intended to be limited to the classification presented in this embodiment.

Further, in regard to the temperature during the decomposition treatment, it goes without saying that the present invention-is not intended to be limited to the values presented in this embodiment. The present invention is applicable to the decomposition temperature 200° C. or higher and lower than the critical temperature of the solvent.

In this embodiment, although ethylene glycol was taken for example of the decomposition solution, the present invention is intended to be limited to the composition and compound ratio as described above. The present invention is applicable to the decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone.

In the present invention, in order to prevent oxidation deterioration of the solvent or magnet powder, a step of removing oxygen from the decomposition bath may be provided prior to the decomposition treatment step for separating magnet powder. One example of the processes for removing oxygen is such that nitrogen is sent to the decomposition bath to be substituted for the gas in the decomposition bath including the decomposition solution. Nitrogen may be sent from a nitrogen gas cylinder directly to the decomposition bath by providing a gas introducing pipe and an exhaust valve to the decomposition bath in which the resin-set bonded magnets and the decomposition solution have been already placed. Alternatively, the process to evacuate the decomposition bath may be used. In order to evacuate the decomposition bath, an exhaust valve should be provided to and a vacuum pump should be installed in the decomposition bath in which the resin-set bonded magnets and the decomposition solution have been already placed. In both cases, oxygen can be removed more effectively by stirring the decomposition solution and moderately heating the same.

The preferable process is first to sent nitrogen to the decomposition bath to be substituted for the gas therein, then to evacuate the decomposition bath.

Conducting the decomposition treatment after conducting the pretreatment for removing oxygen from the decomposition bath enables the prevention of oxidation, which is the main cause of the deterioration of the decomposition solution during the high-temperature reaction treatment, and also enables the increase in the life of the decomposition solution, and hence the improvement in the endurance to repeated use. This also prevents the oxidation deterioration of the alloys constituting the magnet powder of the bonded magnets; accordingly, the quality of the separated and collected magnet powder can also be improved. Since rare earth metals such as neodymium are particularly susceptible to oxidation, this pretreatment step is effective in maintaining the quality of the magnet powder after the decomposition treatment.

In the decomposition treatment process of the present invention, in order to prevent the oxidation deterioration of the solvent or the oxidation deterioration of the metals constituting the magnets, an antioxidant or a reducing agent can be added directly to the decomposition solution.

As the antioxidant or the reducing agent, preferably used is at least one selected from the group consisting of hydroquinone, methoquinone, benzoquinone, naphthoquinone, butylcatechol, butylhydroquinone, sodium hypophosphite, sodium thiosulfate and ascorbic acid.

These antioxidants or the reducing agents are easy to provide to the decomposition solution because they are satisfactorily soluble in the decomposition solution of the present invention, and their effect is considerable.

In the decomposition treatment process of the present invention, a step may be added of washing the magnetic material powder, which was separated and collected after the decomposition treatment, with solvents such as acetone. In addition, in order to fully remove the decomposed resin remaining in the magnetic material powder and the solvent attached to the same even after decomposition and collection the washing, a step of drying may be added. Adding both of these steps enables removing the impurities attached to the separated and collected magnetic material powder more completely, and hence improving the magnetic properties of the bonded magnets newly molded.

The repeatedly used decomposition solution can be reused by removing the matter dissolved therein or can be used as an oil fuel as it is.

Embodiment 5

Another embodiment of the method of recycling bonded magnets according to the present invention will be described below.

In this embodiment, a method of the present invention will be described taking the case where the bonded magnets are produced by agglomerating and setting rare earth permanent magnet powder using an epoxy resin as a binder.

The rare earth permanent magnets include, for example, SmComagnet; however, this embodiment will be described taking Nd—Fe—B magnet for example.

A bonded magnet was obtained by kneading the Nd—Fe—B magnet powder as a raw material powder and 3% by weight of epoxy resin and by molding the mixture into ring shape by the compression molding. The bonded magnet thus obtained was used as a test specimen.

The ring-shaped bonded magnet was subjected to. decomposition treatment by bringing into contact with a decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isbpropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone. In this embodiment, a decomposition solution consisting of tetralin was used. The bonded magnet was immersed in the decomposition solution and placed into a decomposition bath, then it was heated together with the decomposition bath at 300° C. for 3 hours.

As a result, the resin as a binder was completely decomposed and dissolved or dispersed in the decomposition solution while the magnet powder was settled on the bottom of the decomposition bath.

Then, the magnetic material powder settled in the decomposition solution was collected and mixed with a virgin magnetic material powder. Prior to the mixing, the separated and collected magnetic material powder was subjected to classification with respect to the classifying point of 53 $\mu$m, so as to remove as many particles of diameter smaller than 53 $\mu$m as possible. The classified magnetic material powder was mixed with a virgin magnetic material powder in the ratio by weight of 50:50. Three types of bonded magnets were obtained by kneading the mixed raw material powder and 3.2% by weight of, 3% by weight of and 2.8% by weight of epoxy resin, respectively, molding each mixture into ring shape by the compressing molding, and thermosetting. The magnetic properties were measured for each of the three types of bonded magnets.

The density and the maximum magnetic energy product of each of the 3 types of bonded magnets newly obtained and those of the bonded magnet before decomposition treatment are shown in Table 9. As contrast with each other, it is apparent that the density and the maximum magnetic energy product are improved when the mixing ratio of epoxy resin, as the binder, to the bonded magnet is smaller than that of epoxy resin.to the bonded magnet before the decomposition treatment.

This means that there still exists a slight amount of decomposed resin in the magnetic material powder separated and collected from the bonded magnets by the decomposition treatment. In other words for the separated and collected magnetic material powder, the void to be filled with binder is small and the amount of the resin to be added is just such that it is needed for bonding the magnet powder. The mixing ratio of the binder is optimally lower than that of the binder to the virgin magnetic material powder. When mixing the excess amount of resin, the density of the bonded permanent bonds is lowered and the magnetic properties of the same deteriorate.

TABLE 9

| Amount of Binder Resin (wt %) | 3.2% | 3.0% | 2.8% | 3.0% |
| --- | --- | --- | --- | --- |
| Density (g/cm$^3$) | 5.93 | 5.99 | 6.04 | 6.02 |
| Maximum Magnetic Energy Product (MGOe) | 9.70 | 9.80 | 9.88 | 9.85 |

As can be seen from Table 9, the mixing ratio of the binder to the raw material powder containing the magnetic material powder separated and collected from the bonded magnet by the decomposition treatment is preferably smaller than that of the binder to the magnetic material powder in the decomposed bonded magnet.

In regard to the composition and construction of the bonded magnets using an epoxy resin as a binder, the present invention is not intended to be limited to the values presented in this embodiment. The binder may be some other resin or rubber, and the magnetic material powder may be a rare earth permanent magnet, an alnico magnet, etc.

In regard to the magnetic material powder as raw material powder, the present invention is not intended to be limited to the particle size distributions presented in this embodiment. And in regard to the separated and collected magnetic material powder, the present invention is not intended to be limited to the classification presented in this embodiment.

Further, in regard to the temperature during the decomposition treatment, it goes without saying that the present invention is not intended to be limited to the values presented in this embodiment. The present invention is applicable to the decomposition temperature 200° C. or higher and lower than the critical temperature of the solvent.

In this embodiment, although ethylene glycol was taken for example of the decomposition solution, the present invention is intended to be limited to the composition and compound ratio as described above. The present invention is applicable to the decomposition solution containing at least one solvent selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone.

In the present invention, in order to prevent oxidation deterioration of the solvent or magnet powder, a step of removing oxygen from the decomposition bath may be provided prior to the decomposition treatment step for separating magnet powder. One example of the processes for removing oxygen is such that nitrogen is sent to the decomposition bath to be substituted for the gas in the decomposition bath including the decomposition solution. Nitrogen may be sent from a nitrogen gas cylinder directly to the decomposition bath by providing a gas introducing pipe and an exhaust valve to the decomposition bath in which the resin-set bonded magnets and the decomposition solution have been already placed. Alternatively, the process to evacuate the decomposition bath may be used. In order to evacuate the decomposition bath, an exhaust valve should be provided to and a vacuum pump should be installed in the decomposition bath in which the resin-set bonded magnets and the decomposition solution have been already placed. In both cases, oxygen can be removed more effectively by stirring the decomposition solution and moderately heating the same.

The preferable process is first to sent nitrogen to the decomposition bath to be substituted for the gas therein, then to evacuate the decomposition bath.

Conducting the decomposition treatment after conducting the pretreatment for removing oxygen from the decomposition bath enables the prevention of oxidation, which is the main cause of the deterioration of the decomposition solution during the high-temperature reaction treatment, and also enables the increase in the life of the decomposition solution, and hence the improvement in the endurance to repeated use. This also prevents the oxidation deterioration of the alloys constituting the magnet powder of the bonded magnets; accordingly, the quality of the separated and collected magnet powder can also be improved. Since rare earth metals such as neodymium are particularly susceptible to oxidation, this pretreatment step is effective in maintaining the quality of the magnet powder after the decomposition treatment.

In the decomposition treatment process of the present invention, in order to prevent the oxidation deterioration of the solvent or the oxidation deterioration of the metals constituting the magnets, an antioxidant or a reducing agent can be added directly to the decomposition solution.

As the antioxidant or the reducing agent, preferably used is at least one selected from the group consisting of hydroquinone, methoquinone, benzoquinone, naphthoquinone, butylcatechol, butylhydroquinone, sodium hypophosphite, sodium thiosulfate and ascorbic acid.

These antioxidants or the reducing agents are easy to provide to the decomposition solution because they are satisfactorily soluble in the decomposition solution of the present invention, and their effect is considerable.

In the decomposition treatment process of the present invention, a step may be added of washing the magnetic material powder, which was separated and collected after the decomposition treatment, with solvents such as acetone. In addition, in order to fully remove the decomposed resin remaining in the magnetic material powder and the solvent attached to the same even after the decomposition and collection or the washing, a step of drying may be added. Adding both of these steps enables removing the impurities attached to the separated and collected magnetic material powder more completely, and hence improving the magnetic properties of the bonded magnets newly molded.

The repeatedly used decomposition solution can be reused by removing the matter dissolved therein or can be used as an oil fuel as it is.

In all the above embodiments, preferably the prescribed percentage of the binder to be removed in the step (a) is determined in terms of the prescribed mixing ratio of the virgin magnetic material powder to the separated and collected magnetic material powder in the step (c). Specifically, when the percentage of the virgin magnetic material powder is high, the percentage of the binder to be removed may be relatively low, but on the other hand, when the percentage of the virgin magnetic material powder is low, desirably-as much binder as possible is removed.

And preferably the prescribed particle diameter in the step (b) is determined in terms of the prescribed mixing ratio of the virgin magnetic material powder to the separated and collected magnetic material powder in the step (c). Specifically, when the percentage of the virgin magnetic material powder is relatively high, the prescribed particle diameter may be relatively small.

Preferably the prescribed percentage in the step (b) is determined in terms of the prescribed mixing ratio of the virgin magnetic material powder to the separated and collected magnetic material powder in the step (c). Specifically, when the percentage of the virgin magnetic material powder mixed in the step (c) is relatively high, the percentage of the particles to be removed of which diameter is smaller than the prescribed particle diameter-may be relatively low.

Further, preferably the average diameter of the virgin magnetic material powder in the step (c) is determined in terms of the prescribed mixing ratio of the virgin magnetic material powder to the separated and collected magnetic material powder in the step (c). Specifically, when the percentage of the virgin magnetic material powder is relatively high, the average diameter of the virgin magnetic material powder may be relatively small.

As described above, according to the recycling method of the present invention, magnet powder can be easily collected from bonded magnets by separating binder therefrom. And recycled magnetic material powder having excellent magnetic properties can be obtained by reusing the magnet powder collected in the above manner.

Further, according to the recycling method of the present invention, bonded magnets having excellent magnetic property can be produced, and valuables are collected and recycled from the used bonded magnets or the bonded magnets as defectives.

What is claimed is:

1. A recycling method of producing magnetic material powder from bonded magnets which are produced by mixing magnetic material powder, as raw material powder, with a binder and subjecting a mixture to molding forming, comprising at least the steps of:

(a) separating and collecting the magnetic material powder from the bonded magnets by removing all or a prescribed percentage of the binder contained in the magnets;

(b) removing all or a prescribed percentage of the particles of diameter smaller than a prescribed particle diameter from the separated and collected magnetic material powder; and (c) mixing the magnetic material powder, from which the particles of diameter smaller than the prescribed one are removed, with a virgin magnetic material powder in a prescribed mixing ratio, so as to produce a new raw material powder.

2. A method of recycling bonded magnets produced by mixing magnetic material powder, as raw material powder, with a binder and subjecting a mixture to molding forming, comprising the steps of:

(a) separating and collecting the magnetic material powder from the bonded magnets by removing all or a prescribed percentage of the binder contained in the magnets;

(b) removing all or a prescribed percentage of the particles of diameter smaller than a prescribed particle diameter from the separated and collected magnetic material powder;

(c) mixing the magnetic material powder, from which the particles of diameter smaller than the prescribed one are removed, with a virgin magnetic material powder in a prescribed mixing ratio, so as to produce a new raw material powder; and (d) mixing the newly produced raw material powder with a prescribed percentage of a binder and subjecting the mixture to molding forming.

3. The recycling method according to claim 1 or 2, wherein the prescribed percentage of the binder to be removed in the step (a) is determined in terms of the prescribed mixing ratio in the step (c).

4. The recycling method according to claim 1 or 2, wherein the prescribed particle diameter in the step (b) is determined in terms of the prescribed mixing ratio in She step (c).

5. The recycling method according to claim 1 or 2, wherein the prescribed particle diameter-in the step (b) is determined in terms of the prescribed mixing ratio in the step (c).

6. The recycling method according to claim 1 or 2, wherein an average particle diameter of the virgin magnetic material powder in the step (c) is determined in terms of the prescribed mixing ratio in the step (c).

7. The recycling method according to claim 1 or 2, wherein the average particle diameter of the virgin magnetic material powder in the step (c) is larger than that of the magnetic material powder contained in the bonded magnets used in the step (a).

8. The recycling method according to claim 1 or 2, wherein the prescribed particle diameter in the step (b) is in the range of 20 $\mu$m to 100 $\mu$m, inclusive.

9. The recycling method according to claim 1 or 2, wherein the bonded magnets contain a thermoplastic resin as the binder and the step (a) is a step of dissolving and separating the binder with a solvent capable of solving the thermoplastic resin.

10. The recycling method according to claim 1 or 2, wherein the step (a) comprises bringing the bonded magnets into contact with a decomposition solution containing a solvent capable of decomposing the binder in a decomposition bath and heating the decomposition bath to the temperature-of 200° C. or higher and lower than the critical temperature of the solvent.

11. The recycling method according to claim 10, wherein the solvent is selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1,-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophrone, 2-hexanone, 2-heptanone, 4-heptanone, diisobutyl ketone, acetonylacetone, phorone, cyclohexanone, methylcyclohexanone and acetophenone.

12. The recycling method according to claim 2, wherein the prescribed percentage of the binder in the step (d) is made smaller than that of the binder of the bonded magnets used in the step (a).

* * * * *

UNITED STATES PATENT AND TRADEMARK OFFICE
CERTIFICATE OF CORRECTION

PATENT NO.   : 6,599,450 B1
DATED        : July 29, 2003
INVENTOR(S)  : Takahiko Terada et al.

It is certified that error appears in the above-identified patent and that said Letters Patent is hereby corrected as shown below:

<u>Title page,</u>
Item [56], References Cited, FOREIGN PATENT DOCUMENTS, delete duplicate reference "JP 07111208" and "JP 10055908"

<u>Column 26,</u>
Line 5, delete "She" and substitute therefore -- the --.

Signed and Sealed this

Twenty-third Day of December, 2003

JAMES E. ROGAN
*Director of the United States Patent and Trademark Office*